United States Patent [19]

Miles et al.

[11] 4,189,383

[45] Feb. 19, 1980

[54] NOVEL COMPOSITIONS OF MATTER FOR USE IN THE TREATMENT OF AQUEOUS SYSTEMS

[75] Inventors: Peter Miles, Stockport; Norman Richardson, Middleton; Michael A. Finan, Macclesfield, all of England

[73] Assignee: Ciba-Geigy Corporation, Ardsley, N.Y.

[21] Appl. No.: 919,118

[22] Filed: Jun. 26, 1978

Related U.S. Application Data

[62] Division of Ser. No. 707,126, Jul. 20, 1976, Pat. No. 4,111,804.

[30] Foreign Application Priority Data

Jul. 23, 1975 [GB] United Kingdom ............... 30718/75

[51] Int. Cl.$^2$ ................................................ C02B 5/06
[52] U.S. Cl. ................................ 210/58; 252/180; 252/181
[58] Field of Search .................... 210/54, 58; 252/180, 252/181; 260/29.6 Z, 29.7 SQ, 456 R

[56] References Cited

U.S. PATENT DOCUMENTS

| | | | |
|---|---|---|---|
| 3,665,035 | 5/1972 | Rice et al. .................... | 260/537 S |
| 3,699,069 | 10/1972 | Peaker ..................... | 260/29.7 SQ |
| 3,756,257 | 9/1973 | Rice et al. ................. | 210/58 |
| 3,759,860 | 9/1973 | Peaker ..................... | 260/29.7 SQ |
| 3,776,874 | 12/1973 | Dannals ..................... | 260/29.6 TA |
| 3,787,488 | 1/1974 | Greenfield ................... | 260/537 S |
| 3,904,522 | 9/1975 | Greenfield ................... | 210/58 |
| 3,960,824 | 6/1976 | Hicks ....................... | 526/85 |
| 3,965,028 | 6/1976 | O'Brien et al. .............. | 252/180 |
| 4,111,804 | 9/1978 | Miles et al. ................ | 210/58 |

FOREIGN PATENT DOCUMENTS 6916918 5/1970 Netherlands.
1283087 7/1972 United Kingdom.

*Primary Examiner*—Charles N. Hart
*Assistant Examiner*—Peter A. Hruskoci
*Attorney, Agent, or Firm*—Luther A. R. Hall

[57] ABSTRACT

A method of inhibiting scale formation by salts of calcium, magnesium, barium and strontium from aqueous solutions, by adding to the aqueous solution a minor proportion of a product comprising a telomer of formula I:

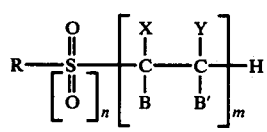

or a salt thereof, wherein X is CO$_2$H when Y is H and vice versa, B and B' are each hydrogen or B is CH$_3$ when B' is H or vice versa, m is an integer from 2 to 100 and n is 0 or 1, R is alkyl having 1 to 22 carbon atoms substituted by one or more hydroxy groups.

7 Claims, No Drawings

NOVEL COMPOSITIONS OF MATTER FOR USE IN THE TREATMENT OF AQUEOUS SYSTEMS

This is a divisional of application Ser. No. 707,126, filed on July 20, 1976, now U.S. Pat. No. 4,111,804, issued on Sept. 5, 1978.

The present invention relates to new compositions of matter and to their use in the treatment of aqueous systems.

The majority of natural waters, and aqueous systems in general, contain dissolved salts of metals such as calcium, magnesium, barium and strontium. When the water or aqueous system is subjected to heating, the dissolved salts may be converted to insoluble salts and deposited as scale on heat transfer surfaces in contact with the water or aqueous system. If the water or aqueous system is concentrated even without heating, insoluble salts may also be precipitated.

Salt precipitation and scale deposition are troublesome and can cause increased costs in maintaining aqueous systems in good working order. Among the problems caused by scale deposits are obstruction of fluid flow, impedance of heat transfer, wear of metal parts, shortening of equipment life, localised corrosion attack, poor corrosion inhibitor performance, and unscheduled equipment shutdown. These problems can arise in water or oil wells, water pipes, steam power plants, water desalination plants, reverse osmosis equipment utilising aqueous solutions, heat exchange equipment, and equipment concerned with the transport of products and by-products in aqueous media (e.g. fly ash formed during the combustion of coal in the production of electricity). The range of temperature at which these processes operate is wide, for example ambient temperatures are used for cooling water and elevated temperatures are used for steam power plants.

One method used to overcome the disadvantages associated with scale formation has involved the dismantling of equipment to enable the accumulated deposits to be cleaned out. This procedure is costly and does not prevent scale redeposition. Another method, described by M. N. Elliot, Desalination, 6, (1969), p. 87 involves the use of strong alkali solution for the removal of, in particular, sulphate scale. It has been alleged that under suitable conditions of temperature and time the alkali treatment eventually provides an initial break up of the scale, which can then be removed by mechanical means. Such a method requires considerable time, and the removal of scale subsequent to treatment is often difficult.

There is, therefore, a need in this field for a composition which can be added to water or aqueous systems in very small quantities and which can reduce the rate at which insoluble salts are precipitated over a wide temperature range. Furthermore when any scale is formed, it should desirably be easily removable from surfaces by mechanical means, as discussed in the article by D. R. Sexsmith, Industrial Water Engineering, Dec. 1969, p. 20.

A wide range of additives has been suggested for addition to water or aqueous systems for these purposes, among them polyphosphates, lignin sulphonic acids, polycarboxylic acids such as polyacrylic acid and polymaleic acid. The polyphosphates ultimately allow the formation of a soft friable scale which is easily removed from the surfaces, whereas polyacrylic acids eventually allow the formation of a uniform, hard, adherent, egg-shell like scale. However, polyphosphates are less effective above 90° C. since they hydrolyse to orthophosphates. This precludes their use in high temperature desalination systems as disclosed by M. N. Elliott, Desalination, 6 (1967), p. 90. Polymaleic acid of molecular weight <2,000 ultimately allows, these higher tempertures, the formation of a non-uniform scal which is relatively easily removed, as described in U.S. Pat. No. 3,919,258.

The present invention relates to telomeric compounds which show good control of calcium carbonate, calcium sulphate and magnesium hydroxide scales and more importantly modify the crystal structure of the scale so that it is non-uniform and easily removable.

According to the present invention, therefore, there is provided a method of inhibiting scale formation by salts of calcium, magnesium, barium and strontium from aqueous solutions over a wide range by adding to the aqueous solution a minor proportion of a product comprising a telomer of formula I:

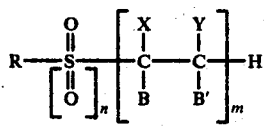

or a salt thereof, wherein X is $CO_2H$ when Y is H and vice versa, B and B' are each hydrogen or B is $CH_3$ when B' is H or vice versa, m is an integer of from 2 to 100 and n is 0 or 1, R is a hydroxyl group, an aliphatic residue having from 1 to 22, preferably 13 to 20 carbon atoms, an alicyclic residue having from 5 to 12 carbon atoms or an aromatic residue having from 6 to 20 carbon atoms, each unsubstituted or optionally substituted by one or more mercapto, hydroxyl, alkoxy, carbonyl, carboxyl, or alkoxycarbonyl or alkoxy sulphonyl groups in which the alkoxy groups contain up to 20 carbon atoms or a residue having the following formula:

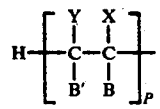

in which B, B', X and Y have their previous significance and p is an integer from 2 to 100 and may be the same as m or different, or a group having one of the following formulae:

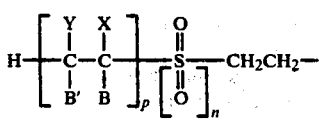

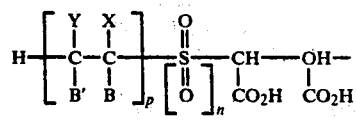

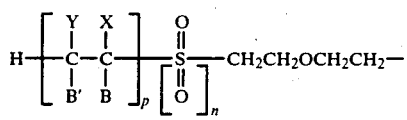

wherein X, Y, B, B', n and p have their previous significance, or a mixture of telomers of formula I. Preferably, n is 0 and m is preferably 2 to 20 and especially 5 to 20.

The grouping

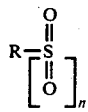

may be a sulphoxide (when n=0) or the corresponding sulphone (when n=1).

When R is an aliphatic residue, it is preferably an alkyl residue having from 1 to 22, especially 13 to 20 carbon atoms. Examples of alkyl residues R are methyl, ethyl, n-propyl, isopropyl n-butyl, t-butyl, n-hexyl, n-octyl, n-decyl, n-dodecyl, n-tridecyl, n-tetradecyl, n-hexadecyl, n-octadecyl, n-cicosyl and n-docosyl residues.

When R is an alicyclic residue, it is preferably a cycloalkyl residue having from 5 to 12 carbon atoms, especially a cyclopentyl or cyclohexyl residue.

Preferred aromatic residues R are phenyl and naphthyl residues.

Preferred examples of substituted residues R include cyclohexyl, phenyl and especially alkyl residues substituted by one or more mercapto, hydroxyl, alkoxy, carbonyl, carboxyl, alkoxycarbonyl or alkoxy-sulphonyl groups. Particularly preferred substituted residues R are alkyl residues having from 1 to 6 carbon atoms substituted with one to three hydroxy or carboxyl groups e.g. carboxymethyl, carboxyethyl, 1,2-dicarboxyethyl, carboxypropyl, carboxybutyl, 2-hyroxyethyl, 2,3-dihydroxypropyl, and 1 mercapto-1,2-dicarboxy ethyl residues, or a group having the formula:

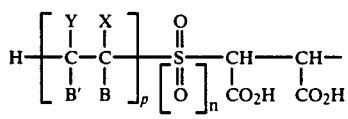

wherein X, Y, B, B', m and p have their previous significance.

The amount of the compound of formula I which may be used in the method according to the present invention is preferably within the range of from 0.2 part to 500 parts per million, especially from 0.2 part to 10 parts per million, based on the water to be treated.

The compounds of formula I and mixtures thereof including reaction products containing compound of formula I and salts thereof are particularly effective in inhibiting the deposition of calcium sulphate, magnesium hydroxide and calcium carbonate scales.

Mixtures of telomers of formula I are effective scale inhibitors when used in the method of the present invention and such mixtures may be obtained by admixing telomers of formula I having differing values for m and/or n and/or p.

Examples of the bases with which compounds of formula I may be reacted in order to form partial or complete salts are the hydroxides and carbonates of sodium, potassium and ammonia. Similarly, organic bases may be employed. For instance, primary, secondary and tertiary alkyl and substituted alkyl amines may be employed in which the total carbon number does not exceed twelve, such as triethanolamine. These salts also have good activity in inhibiting the precipitation of insoluble salts from aqueous solution.

The compounds of formula I, reaction products containing compounds of formula I and salts thereof are effective in inhibiting the deposition of scale and precipitation of salts from aqueous solutions. The scale forming salts are derived from calcium, magnesium, barium or strontium cations and anions such as sulphate, carbonate, bicarbonate, hydroxide, phosphate or silicate.

The majority of the compounds of formula I are new and form part of the present invention. However, the compounds of formula I wherein R is an alkyl residue having from 6 to 12 carbon atoms are described in U.S. Pat. Nos. 3,699,069 and 3,759,860. The U.S. Patent Specifications do not, however, suggest that the said compounds could be used in aqueous systems, rather that they are useful in textile coating applications.

Accordingly, the present invention also provides a compound having the formula:

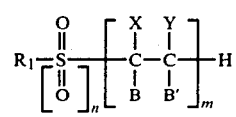

wherein X, Y, B, B', m and n have their previous significance and $R_1$ is an hydroxyl group, an unsubstituted aliphatic residue having from 13 to 22 carbon atoms, an unsubstituted alicyclic residue having from 5 to 12 carbon atoms or an unsubstituted aromatic residue having from 6 to 20 carbon atoms, or an aliphatic residue having from 1 to 22 carbon atoms, an alicyclic residue having from 5 to 12 carbon atoms or an aryl residue having from 6 to 20 carbon atoms, each substituted by one or more mercapto, hydroxyl, alkoxy, carbonyl, carboxyl, alkoxycarbonyl or alkoxysulphonyl groups in which the alkoxy groups contain up to 20 carbon atoms, or a residue having one of the formula II, III, IV or V as hereinbefore defined.

Preferred instances of m and n are the same as those indicated for compounds of formula I.

Similarly, preferred examples of substituent $R_1$ are the same as the preferred examples of substituent R in the compounds of formula I.

Examples of new compounds of formula IA are those having the following residues $R_1$, B and B' and the following values of m and n:

| $R_1$ | B | B' | m | n |
| --- | --- | --- | --- | --- |
| $-CH_2CO_2H$ | H | H | 9 | 0 |
| $-CH_2CO_2H$ | H | H | 9 | 1 |
| $HOCH_2CH_2-$ | H | H | 8 | 0 |
| $HOCH_2CH_2-$ | H | H | 8 | 1 |
| $-CH_2CO_2H$ | H | $CH_3$ | 11 | 0 |
| $-(CH_2)_2CO_2H$ | H | $CH_3$ | 11 | 1 |
| $HOCH_2CHCH_2$<br>\|<br>OH | H | H | 13 | 0 |
| ⌬- | H | H | 15 | 0 |
| $C_{22}H_{45}-$ | H | H | 16 | 0 |

| R₁ | B | B' | m | n |
|---|---|---|---|---|
| HO₂CCH— \| CH₃ | H | CH₃ | 12 | 0 |
| HO₂CCH— \| CH₃ | H | CH₃ | 12 | 1 |
| CH₃ \| CH₃—C— \| CH₃ | H | H | 12 | 0 |
| OH | H | H | 13 | 1 |
| 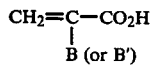 | H | H | 12 | 0 |
| Compounds of Formula IV wherein X = H, Y = CO₂H P = m | H | H | 13 | 0 |

The present invention further provides a process of producing a compound of formula IA comprising reacting a compound of the formula:

$$HO_2C-\underset{B}{C}=\underset{B'}{CH} \text{ or } \underset{B}{CH}=\underset{B'}{C}-CO_2H$$

wherein B and B' have their previous significance, with a compound of formula $R_1SH$, wherein $R_1$ has its previous significance, in the presence of a free radical initiator, and then oxidising the thiol-terminated telomer so obtained.

Compounds of formula IA may be conveniently prepared by reacting at a temperature of from about 24° C. to 80° C. in an inert solvent, appropriate quantities of a compound of the formula $$CH_2=\underset{B \text{ (or B')}}{C}-CO_2H$$

wherein B or B' has its previous significance with a compound $R_1SH$ where $R_1$ has its previous significance, in the presence of a free radical initiator. The inert solvent used may be any solvent or solvent system which will dissolve the reactants without reacting them per se in any substantial amount with the reactants or with the composition of the invention. For example ethylene glycol or dimethyl formamide may be used but water is particularly preferred. The thiol terminated telomers are then reacted with conventional oxidising agents for conversion either to the corresponding sulphoxide or sulphone depending upon the degree of severity of the oxidising conditions and may be isolated by evaporating the aqueous solution to dryness, dissolving the telomer in methanol or acetone and precipitating with diethyl ether. Oxidising agents most commonly employed for converting sulphides into sulphones are concentrated or fuming nitric acid, potassium permanganate, hypochlorous acid or sodium hypochlorite, chromic acid and hydrogen peroxide (in excess) in acetic acid.

Oxidation with dilute nitric acid and with theoretical quantites of aqueous hydrogen peroxides are used to prepare the sulphoxides. Since it is preferable to work under aqueous conditions the initiator of choice is generally a persulphate salt but other initiators especially acyl peroxides and hydrogen peroxide, which provide free radicals under the reaction conditions, could also be employed.

Other monomer derivatives may be used to obtain the same compounds of formula IA for example, acrylonitrile or methacrylonitrile, methyl acrylate or methyl methacrylate. The monomers are telomerised essentially as described above and then hydrolysed using conventional methods to give the completely acidic material. These alternative routes may be preferred for economic reasons.

The inhibitor composition used according to the method of the invention may be incorporated into the aqueous system to be treated in conjunction with other compounds known to be useful in water treatment.

Dispering and/or other threshold agents and/or scale control agents may be used, such as for example, polymerised acrylic acid and its salts, polymerised methacrylic acid and its salts, polyacrylamide and co-polymers thereof from acrylic and methacrylic acids, lignin sulphonic acid and its salts, tannin, naphthalene sulphonic acid/formaldehyde condensation products, starch and its derivatives, alkylamino bismethylene phosphonic acids, 1-hydroxyalkyl-1,1-disphosphonic acids and nitrilotrimethyl phosphonic acid and cellulose. Specific threshold agents such as for example, hydrolysed polymaleic anhydride and its salts, alkyl phosphonic acids, 1-aminoalkyl, 1,1-diphosphonic acids and their salts and alkali metal phosphates, may also be used.

The inhibitor composition of the present invention may also be used in combination with precipitating agents such as alkali metal orthophosphates, carbonates and hydroxides, oxygen scavengers such as alkali metal sulphites and hydrazine, and sequestering agents such as nitrilotriacetic acid and their salts and ethylene diamine tetraacetic acid and its salts. They may also be used in conjunction with corrosion inhibitors such as cyclohexylamine, morpholine, distearylamine/ethylene oxide condensation products, stearylamine, and also in conjunction with antifoaming agents such as distearyl sebacamide, distearyl adipamide and related products derived from ethylene oxide condensations, in addition to fatty alcohols such as capryl alcohols and their ethylene oxide condensates.

The following Examples further illustrate the present invention.

EXAMPLE 1

To 900 g of water there were added 300 g of acrylic acid, 60 g of mercaptoacetic acid and a solution of 18.75 g of sodium persulphate in 300 g of water. An exothermeric reaction occurred causing the temperature to rise from 23° C. to 97° C. over a period of 15 minutes. After stirring at 97° C. for a further 15 minutes, the reaction mixture was cooled to 30° C. To the resulting solution there were added a further 300 g of acrylic acid, 60 g of mercapto acetic acid and a solution of 18.75 g of sodium persulphate in 75 g of water. An exothermic reaction occurred causing the temperature to rise from 30° C. to 92° C. This addition was repeated a further two times so that the total acrylic acid addition was 1200 g. After the final addition, the reaction mixture was heated at 90° C. for a period of 2 hours to ensure that complete reaction had occurred. A water white solution having an active ingredient content of 54.5% was obtained. To 500 g of the above product there were added 10 mls of concentrated nitric acid and 90 mls of water and the solution was heated at 95° C. for a period of 10 hours.

A sample of the polymer, isolated by evaporating to dryness, dissolving the telomeric residue in methanol and reprecipitating the telomer in diethyl ether then drying under vacuum at 50° C. for 5 hours, showed adsorption of 9.6 microns in the infra-red region of the spectrum due to the sulphoxide group. This adsorption was absent in the infra-red spectrum of the unoxidised telomer.

EXAMPLE 2

The process of Example 1 above was repeated except that in place of the 10 mls of concentrated nitric acid and 90 mls of water there were used 30 mls of 100 volume hydrogen peroxide. The infra-red spectrum of the oxidised polymer again showed adsorption at 9.6 microns due to the sulphoxide group.

EXAMPLE 3

To 250 g of water there were added 40 g of acrylic acid, 4 g of 2-mercapto-ethanol and a solution of 2.5 g of sodium persulphate in 50 g of water. An exothermic reaction occurred causing the temperature to rise from 15° C. to 41° C. over a period of 20 minutes. The reaction mixture was heated to 85° C. and maintained thus for a period of 2 hours to ensure that complete reaction had occurred. A water white solution having an active ingredient content of 13.8% was obtained. To 200 g of the above product there were added 28 mls of 100 volume hydrogen peroxide and the solution heated to 90° C. over a period of 1 hour, and maintained thus for a further 1 hour.

A sample of the polymer isolated as in Example 1 showed adsorption of 9.6 microns in the infra-red region of the spectrum due to sulphoxide group and had a molecular weight of 1,350 as determined by osmometry in methyl ethyl ketone as the solvent.

EXAMPLE 4

The process of Example 3 was repeated except that in place of the 4 g of 2-mercapto ethanol there were used 8 g of di-mercaptosuccinic acid. A water white solution of active ingredient content 16.2% was obtained. After oxidation as in Example 3 a sample of polymer isolated by the procedure given in Example 1 showed adsorption at 9.6 microns in the infra-red region of the spectrum due to the sulphoxide group, and had a molecular weight of 1300 determined by osmometry in methyl ethyl ketone as the solvent.

EXAMPLE 5

The process of Example 3 was repeated except that in place of the 4 g of 2-mercapto ethanol there were used 8 g of 1-thio glycerol.

The polymer showed adsorption at 9.5 microns in the infra-red region of the spectrum due to the sulphoxide group and had a molecular weight of 960 determined by osmometry in methyl ethyl ketone as the solvent.

EXAMPLE 6

The process of Example 3 was repeated except that in place of the 4 g of 2-mercapto ethanol there were used 8 g of 2-mercapto propionic acid.

The polymer showed adsorption at 9.5 microns in the infra-red region of the spectrum due to the sulphoxide group and had a molecular weight of 1050 determined by osmometry in methyl ethyl ketone as the solvent.

EXAMPLE 7

The procedure of Example 1 was repeated excepting that oxidation was carried out by the following method. 300 g of the polymer solution were evaporated to dryness. The telomeric residue was dissolved in 150 g of glacial acetic acid and 56.3 ml of 100 volume hydrogen peroxide added. The resulting solution was heated to 90° C. over a period of 1 hour and maintained thus for a further 2 hours. The polymer was isolated by evaporating to dryness, dissolving in methanol and reprecipitating in diethyl ether. After drying under vacuum at 50° C. for 5 hours the polymer showed adsorption at 8.6 microns in the infra-red region of the spectrum due to the sulphone group and had a molecular weight of 820 determined by osmometry in methyl ethyl ketone as solvent.

EXAMPLES 8 to 14

Activity as threshold agents for calcium carbonate 2 ml. of a 1,000 ppm aqueous solution of the compound under test were mixed in a beaker with 100 ml. of an aqueous solution containing 1.47 g/l Ca(NO$_3$)$_2$.4-H$_2$O. 100 ml. of an aqueous solution containing 0.646 g/l. Na$_2$CO$_3$ were added and the beaker placed on a magnetic stirrer/hotplate, so adjusted that the solution warmed to 95° C. (203° F.) over a period of 7 minutes. The solution was continuously pumped through the cell of an Autoanalyser colorimeter at a rate of 4 ml./minute and its optical density recorded. From the recorded chart of optical density against time 5 measurements were noted.

1. The initiation time, defined as the time after mixing the two solutions at which precipitation commenced (as judged by an increase in optical density).
2. The rate of precipitation, defined as the maximum positive slope of the recorder trace, disregarding any rapid short-term increase from the base line of less than 15% of the optical density shown by a fully precipitated blank solution.
3,4. The percentage precipitation which had occurred 15, 30 and 45 minutes after mixing the solutions, calculated by comparing the optical density at the given time to the optical density of a solution containing no additives at the same times.

The results obtained using the product of Examples 1 or 2 as the compound under test are set out in Table I which also includes data relating to a control experiment using no threshold agent.

Table I

| | | Activity of compounds as threshold agents For Calcium Carbonate | | | | | |
|---|---|---|---|---|---|---|---|
| | | Concentration of additive | Initiation Time | Rate of Precipitation | % Precipitation | | |
| Example | Threshold Agent | p.p.m. | minutes | | 15 mins | 30 mins | 45 mins |
| | Blank | 0 | 1 | 7.9 | 100 | 100 | 100 |
| 8 | Product from Example 1 | 10 | 8 | 0.3 | 5 | 12 | 40 |
| 9 | Product from Example 2 | 10 | 9 | 0.5 | 4 | 12 | 24 |
| 10 | Product from Example 3 | 10 | 6.5 | 0.69 | 20 | 48 | 70 |
| 11 | Product from Example 4 | 10 | 10 | 0.60 | 16 | 32 | 80 |
| 12 | Product from Example 5 | 10 | 8 | 0.39 | 12 | 32 | 88 |
| 13 | Product from Example 6 | 10 | 10 | 0.30 | 8 | 30 | 60 |
| 14 | Product from Example 7 | 10 | 9 | 0.45 | 16 | 30 | 78 |

EXAMPLES 15 TO 21

Two brine solutions containing calcium and sulphate were prepared as follows:

Calcium Brine 7.5 g/liter NaCl
21.6 g/liter $CaCl_2 \cdot 2H_2O$

Sulphate Brine 7.5 g/liter NaCl
21.3 g/liter $Na_2SO_4$ 50 mls of calcium brine, containing the amount of the compound under test to give the required concentration in the final solution, were mixed with 50 mls of sulphate brine to give a solution containing 10,000 mg/liter of $CaSO_4$. The mixed solution was stirred in a sealed 4 oz. glass bottle 70±2° C. for 18 hours. At the end of the test period the calcium concentration in the test solution was determined by titration with EDTA and the results were expressed in mg/liter of $CaSO_4$.

The results obtained using the products of Examples 1–7 or 2 as the compound under test are summarised in Table II which also includes data relating to a control experiment.

Table II

| | | Activity of compounds as threshold agents for Calcium Sulphate | |
|---|---|---|---|
| Example | Threshold agent active ingredient. | Concentration of active ingredient p.p.m. | Concentration of $Ca^2$ in final solution mg/l $CaSO_4$ |
| — | none | nil. | 3540 |
| 15 | Product of Example 1 | 10 | 8931 |
| 16 | Product of Example 2 | 10 | 9585 |
| 17 | Product of Example 3 | 10 | 8536 |
| 18 | Product of Example 4 | 10 | 8965 |
| 19 | Product of Example 5 | 10 | 8873 |
| 20 | Product of Example 6 | 10 | 9248 |
| 21 | Product of Example 7 | 10 | 9140 |

We claim:

1. A method of inhibiting scale formation by salts of calcium, magnesium, barium and strontium from aqueous solutions which comprises adding to the aqueous solution an amount within the range of from 0.2 part to 500 parts per million, based on the water to be treated, of a product comprising a telomer of formula I

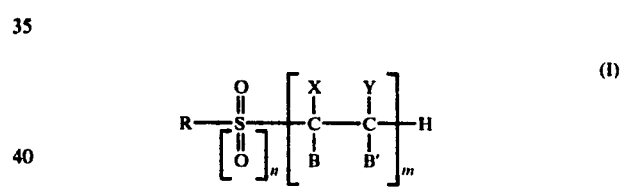

(I)

or a salt thereof, wherein X is COOH when Y is H, or Y is COOH when X is H; B and B' are each hydrogen, or B is $CH_3$ when B' is H, or B' is $CH_3$ when B is H; m is an integer from 2 to 100; n is 0 or 1; and R is alkyl having from 1 to 22 carbon atoms substituted by one or more hydroxy groups.

2. A method as claimed in claim 1 wherein R is an alkyl having from 1 to 6 carbon atoms substituted with one to three hydroxy groups.

3. A method as claimed in claim 2 wherein R is 2-hydroxyethyl or 2,3-dinydroxypropyl.

4. A method as claimed in claim 1 wherein n is 0 and m is 2 to 20.

5. A method as claimed in claim 4 wherein m is 5 to 20.

6. A method as claimed in claim 1 wherein the amount used of the compound of formula I is within the range of from 0.2 part to 10 parts per million, based on the water to be treated.

7. A method as claimed in claim 1 wherein a water-soluble salt of a compound of formula I is used.

* * * * *